G. KLEEMANN.
MACHINE FOR MAKING BRUSHES.
APPLICATION FILED AUG. 29, 1911.

1,083,499.

Patented Jan. 6, 1914.
6 SHEETS—SHEET 2.

Witnesses
Cornelius Hoving
John H. Hoving

Inventor
Georg Kleemann
By Ivan Shearer
Attorney

G. KLEEMANN.
MACHINE FOR MAKING BRUSHES.
APPLICATION FILED AUG. 29, 1911.

1,083,499.

Patented Jan. 6, 1914.
6 SHEETS—SHEET 3.

Witnesses
Cornelius Hoving.
John N Hoving

Inventor
Georg Kleemann
By H van Dedemsul
Attorney

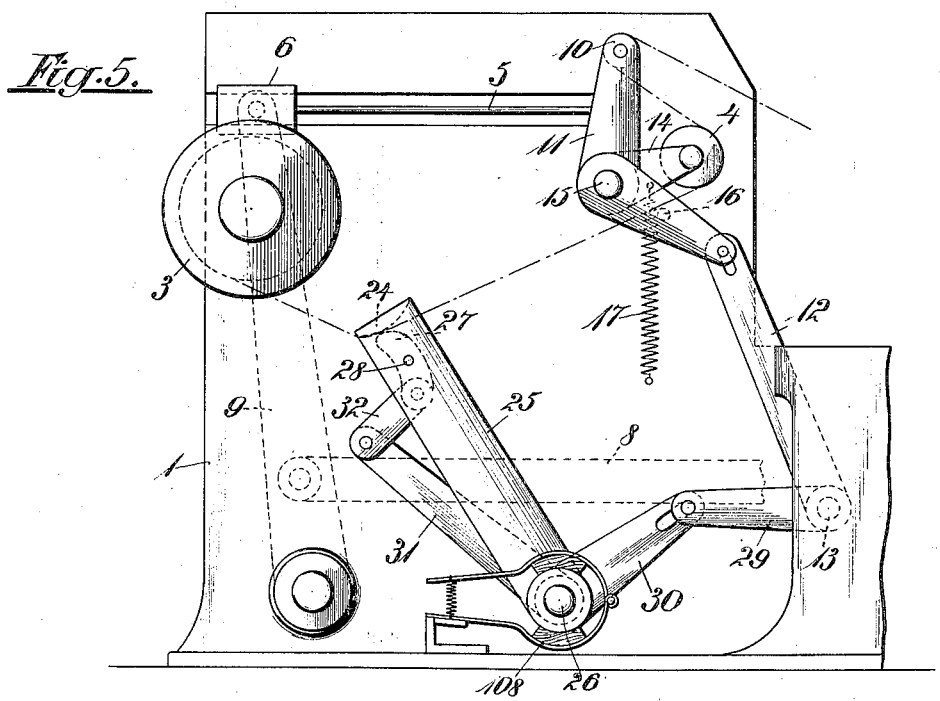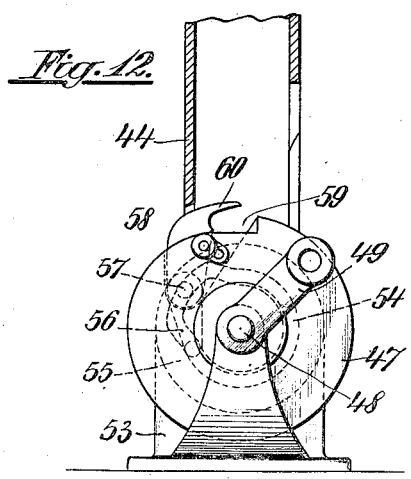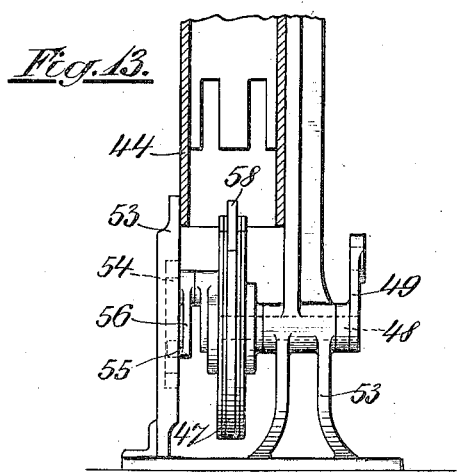

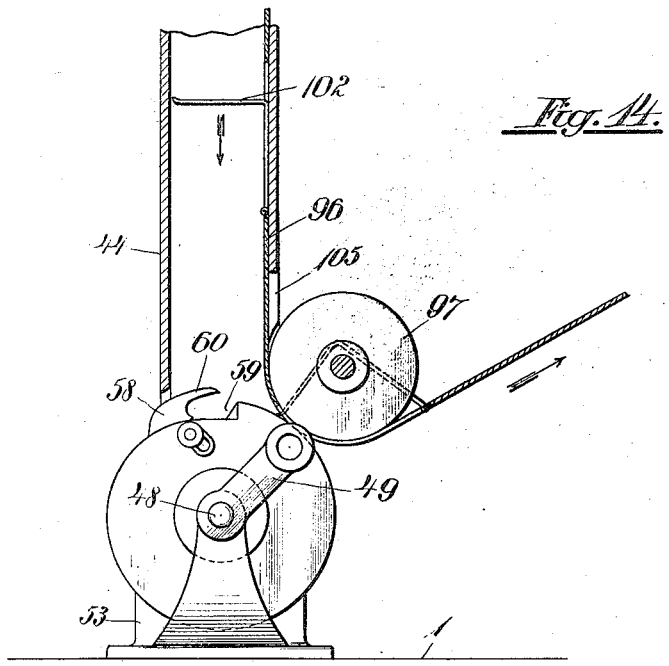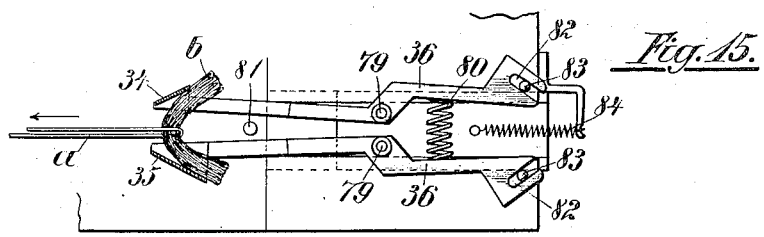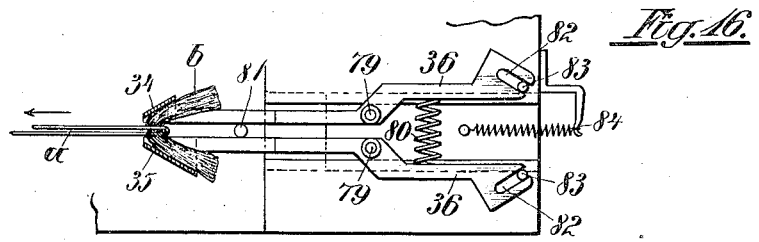

G. KLEEMANN.
MACHINE FOR MAKING BRUSHES.
APPLICATION FILED AUG. 29, 1911.

1,083,499.

Patented Jan. 6, 1914.
6 SHEETS—SHEET 6.

Witnesses
Cornelius Hoving
John H. Hoving

Inventor
Georg Kleemann
By H. van Delemmel
Attorney

UNITED STATES PATENT OFFICE.

GEORG KLEEMANN, OF STUTTGART, GERMANY.

MACHINE FOR MAKING BRUSHES.

1,083,499. Specification of Letters Patent. Patented Jan. 6, 1914.

Application filed August 29, 1911. Serial No. 646,578.

*To all whom it may concern:*

Be it known that I, GEORG KLEEMANN, a citizen of the German Empire, residing at Stuttgart, in the Kingdom of Wurttemberg, Germany, have invented an Improved Machine for Making Brushes; and I do hereby declare the following to be a full, clear, and exact description of the invention, such as will enable others skilled in the art to which it appertains to make and use the same.

This invention relates to machines for automatically drawing tufts of brush material into brush blocks, and has for its object to provide a machine which will automatically and quickly fix the tufts in the brush in a reliable and efficient manner.

Figure 1:
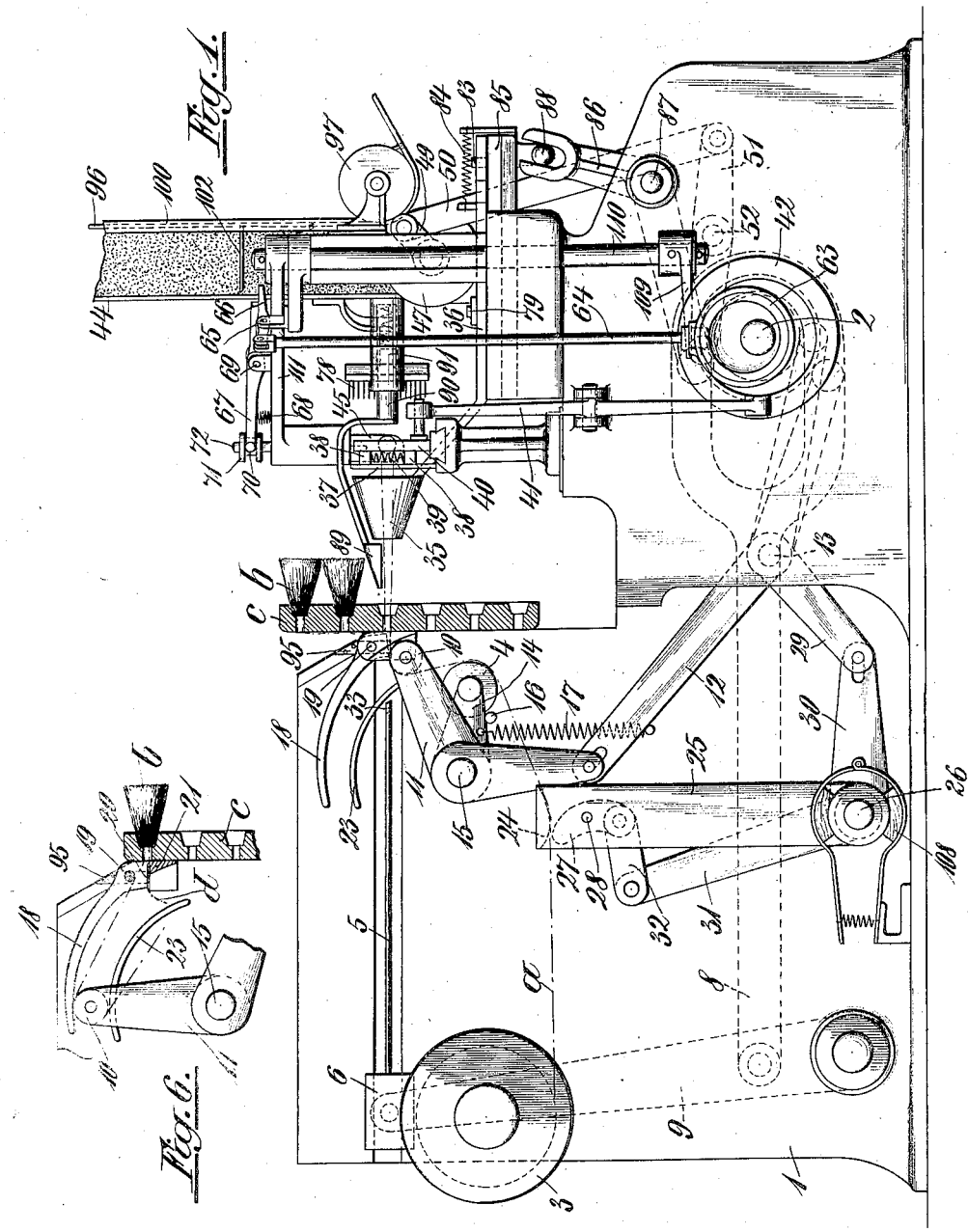
Figure 2:
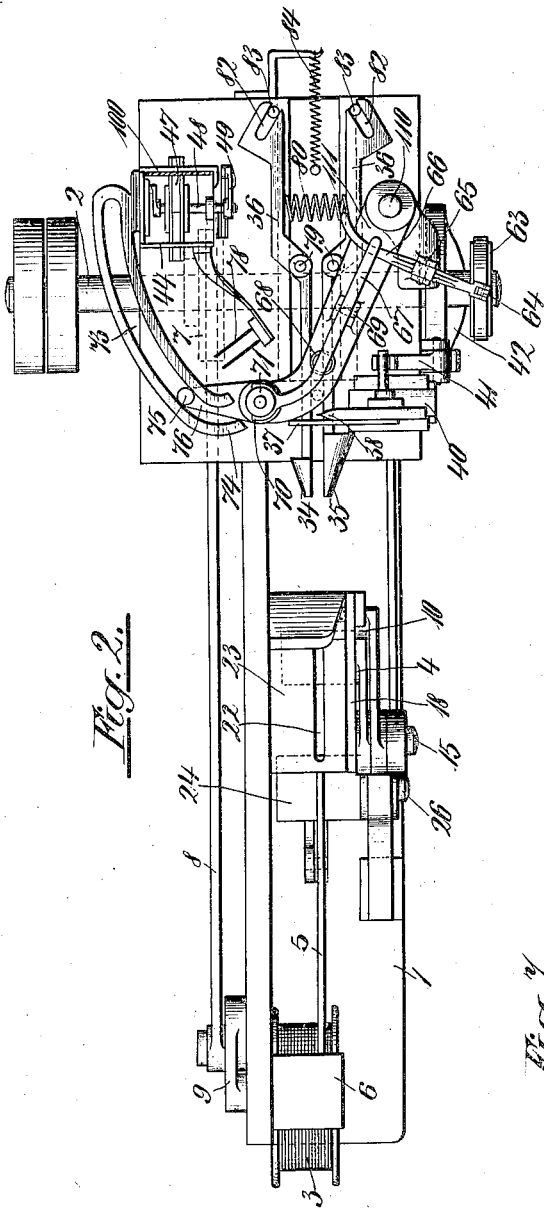
Figure 3:
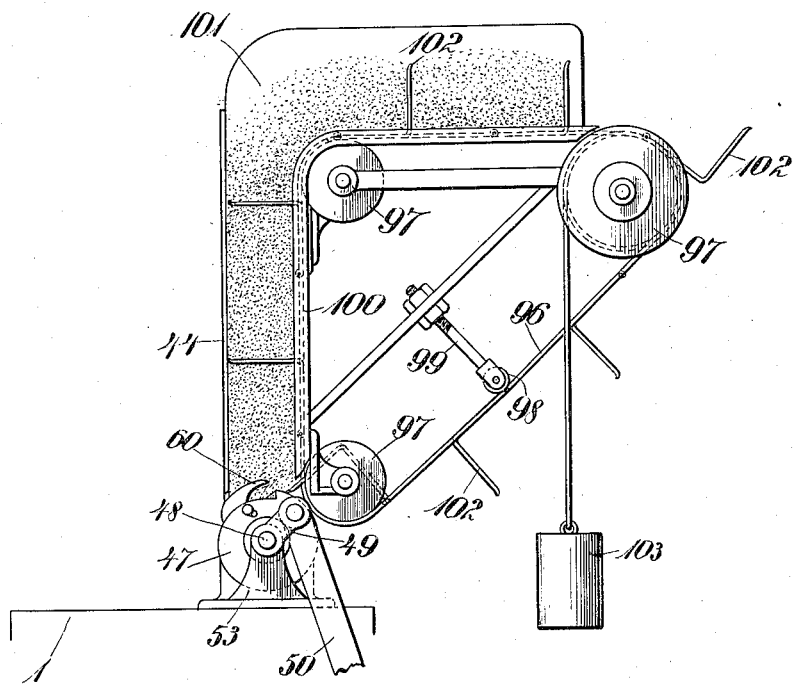
Figure 4:
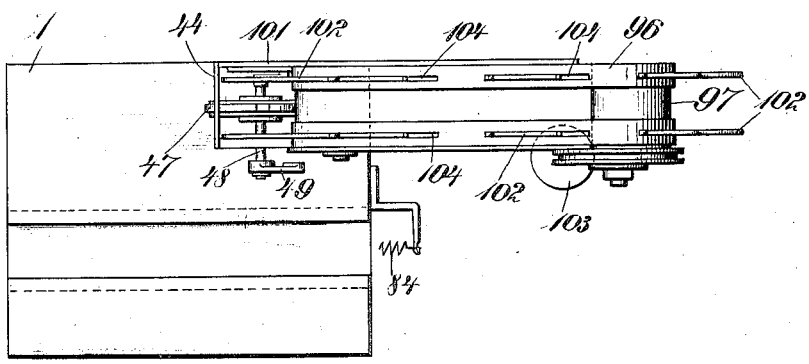
Figure 19:
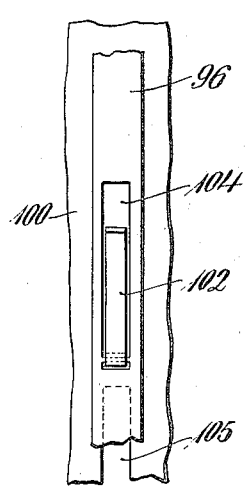
Figure 20:
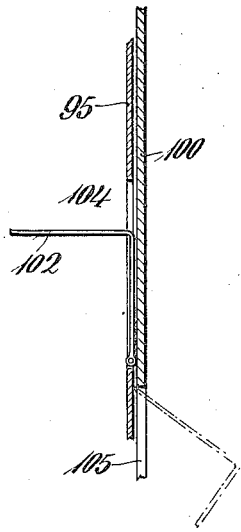
Figure 21:
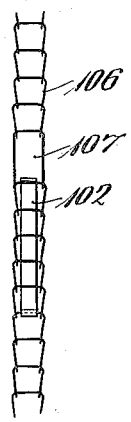
Figure 22:
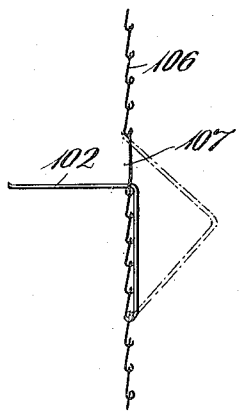
Figure 17:
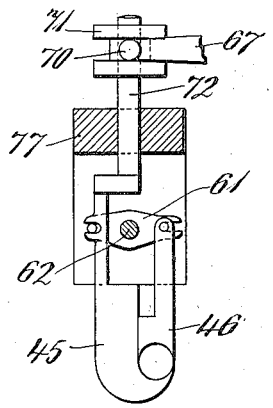
Figure 18:
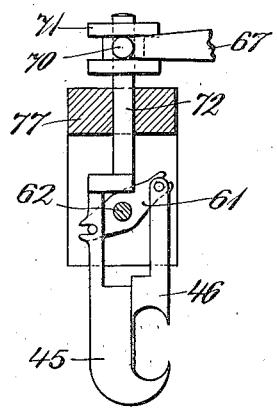

In the accompanying drawing Figure 1 is a side view of the new machine with brush in section and the material feeding device omitted. Fig. 2 is a plan view of the machine. Fig. 3 shows the device for feeding the material, that is the brush material, while Fig. 4 is a plan view. Fig. 5 is a side elevation of the clamping and tension device in the working position. Fig. 6 shows a sectional side view of a clamping device for holding fast the end of the wire. Figs. 7 and 8 show in side view the initial and final positions of a protective cap. Figs. 9 and 10 explain in two different views the operation of the spreading device. Fig. 11 shows the rear view of a brush and indicates the course of the wire. Fig. 12 is a front elevation of the tuft dividing device, while Fig. 13 is a side elevation. Fig. 14 shows on a larger scale and in section the dividing and feeding devices. Figs. 15 and 16 show a plan view of the pliers in open and shut position. Figs. 17 and 18 explain in partially sectional side elevation the operation of the pliers. Figs. 19 and 20 show front elevation and lateral section of the conveyer belt with the deflectable catch pins, while Figs. 21 and 22 represent similar views of another form of construction.

In the machine frame 1 is mounted the driving shaft 2 by which the various devices of the machine are set in motion by means hereinafter described.

The wire $a$ to be worked, which serves for the insertion of the tuft $b$ into the previously prepared brush block $c$, is wound upon a loosely rotatable reel 3 and runs through a clamping device over a guide roller 4 to the usual needle 5. This is fastened in a horizontally movable head 6, which is reciprocated by the driving shaft 2 by means of the eccentric disk 7 and a rod 8 as well as a lever 9. In order to present the wire $a$ from the guide roller 4 before the needle 5 (Fig. 5), there is provided a roller 10 which is carried for instance by an angle lever 11, which by the aid of an eccentric is driven by the driving shaft 2 through the medium of a double-armed lever 12 which turns about a pin 13.

According to the present invention the guide roller 4 is movably arranged and for this purpose is mounted upon a swinging lever 14, which for instance swings about the same point of rotation as the angle lever 11. The position of rest of the lever 14 is determined by a pin 16 against which it is pressed by a spring 17.

Wire clamps are also provided one of which only comes into operation at the commencement of work (Figs. 1 and 6), while the other prevents any unwinding of the wire $a$ from the reel 3 as soon as the wire in front of the needle is drawn taut (Fig. 5). The first clamping device (Figs. 1 and 6) consists of a lever arm 18 which turns about a pin 19 and is mounted eccentric to the pivot of the lever 11, so that the roller 10 during its movement runs upon the arm 18 and causes it to turn. By this means the arm 18, by its other part 20 formed as a clamping jaw presses the free end $d$ of the wire $a$ looped through the brush block $c$ against an abutment 21 of the machine frame 1, so that the free end $d$ of the wire $a$ is held fast during the inserting of the wire with tuft $b$ (Fig. 6). Upon swinging the roller 10 the wire $a$ is brought into a slit 22 of a curved plate 23 through which also passes the needle 5. (Figs. 2 and 5). Now in order to prevent unwinding of the wire from reel 3 upon drawing taut the wire lying in front of the needle 5, the second clamping device is provided which works with each step of the operation (Figs. 1 and 5). This consists first of the rigid jaw 24 of a lever 25 which turns about an axis 26, further of a movable jaw 27 which coöperates with the jaw 24 and mounted upon the lever 25 turns about a pin 28. The clamping device is now set in motion by the driving shaft 2. For this purpose a double lever 29 is provided which turns about the pin 13 and is actuated by the driving shaft 2 by means of an eccentric. This double lever 29 is connected with a lever 30 which is mounted on the same axis 26 as a lever 31. Moreover the lever 31 is connected by a link 32 with the movable jaw 27. The lever 25 is braked by a band brake 108.

Upon insertion the wire *a* is first held fast by the clamp 24, 27 and drawn by the lever 25 by means of the lever 30, 31 and the eccentric operated lever 29. The lever 25 then remains in the end position until lever 11 and roller 10, now coming into operation have drawn the tuft into the brush-block by means of the eccentric operated lever 12. Through the increase in tension thus caused the roller 4 and the lever 14 are, according to the degree of the tension, set more or less in motion toward the needle and against the action of the spring 17 and thus compensate the wire tension. Only when the insertion is ended does the lever 25 return by means of lever 31, lever 30 and eccentric operated lever 29, while the wire clamps 24, 27 release the wire *a* so that the spring 17 of the lever 14 can relax. The lever 11 and the roller 10 remain stationary in the end position. One end portion of the lever 11 is shown in Fig. 1 and the other in Fig. 6. The roller 10 draws the wire *a* from the reel 3 but not the supply of wire found above the needle which is necessary when inserting the needle 5 into the brush block *c* and the loop maker so as to prevent breaking of the wire and needle which occurs with a short wire. Hereupon the lever 11 with roller 10 returns and the insertion is finished. Thus the roller 10 presents the wire *a* before the needle 5 provided with open eye 33. If the needle now advances it takes with it the wire *a* and carries it into the head 34, 35 of a gripping pliers 36. Here the wire is first spread (Figs. 1, 2, 9 and 10) and for this purpose a spreading device is provided which consists of tapered jaws 38 and is formed like pliers, being held in the closed position by a spring 39 (Fig. 1). The jaws 38 are carried by a slide arm 40, which is moved forward by the driving shaft 2 by means of a lever 41 and eccentric. Hereupon the points of the jaws 38 enter the loop of the wire *a* and simultaneously the jaws 38 encounter a stop 43 of a suitable wedge shape which spreads them apart and hence widens the loop so that a tuft *b* can be inserted in same. This last device proceeds in known manner and for this purpose the brush material contained in a receptacle is divided into tufts and is inserted by carrying pliers having plier parts 45, 46 into the gripping heads 34, 35 of the gripping pliers 36. The division of the tufts is effected in the following manner. (Figs. 1, 3, 12 and 13): Into the receptacle 44 there projects from below a disk 47 which is rigid upon an axle 48 mounted in a frame 53. Upon this axle 48 is provided a lever arm 49 which is connected with an eccentric, mounted upon the driving shaft 2, by means of a rod 50 and a double lever 51 which turns about a pin 52, the lever arm 49 being driven by this eccentric. Further the frame 53 is provided with an eccentrically formed groove 54 in which slides a pin 55 the arm 56 of which turns about a pin 57 of the disk 47. Upon the pin 57 is also provided an arm 58 and the end of the arm 58 is formed as a finger 60 while the disk 47 has a depression 59, so that upon rotation of the disk 47 the finger 60 seizes as much brush material as the depression 59 can receive. Then the disk 47 is turned back so that the finger 60 and the depression 59 lie outside the receptacle 44.

Pliers 45, 46 are provided which serve to grasp the tuft divided off by the dividing device and to carry it to the above-mentioned head 34, 35 of the gripping pliers 36. The two plier parts 45, 46 are so arranged in relation to each other that upon opening they are moved from each other, and the moving mechanism of the pliers is removed from the working parts, so that it is not in the way of the other surrounding parts. To this end the two parts 45, 46 are connected with the ends of a double-armed lever 61 which turns about a pin 62, so that upon the turning of the lever 61 one plier part 45 is moved downward and the other plier part 46 upward, whereby a rapid opening of the pliers 45, 46 is obtained and a slight movement only is necessary (Figs. 17 and 18). Now in order to swing the lever 61 and to open the pliers 45, 46, the following device is provided: Upon the driving shaft 2 is placed an eccentric 63 the rod 64 of which shifts a lever 66 turning about a pin 65, which lever engages and raises a lever 67, whereupon the latter turns about a pin 69 against the action of a spring 68 and with its fork end 70 simultaneously raises a double connection 71. The latter is situated upon a prolonged part 72 of one of the two plier parts 45 or 46 so that upon working the eccentric 63 the pliers 45, 46 are opened and closed. Finally the carrying pliers must be guided so that the brush tuft will lie exactly before the heads 34, 35. For this purpose there is provided a guide 73 with bent ends 74, in which moves a pin 75 of an arm 76 of the plier part 77 and thereby accomplishes the necessary movement of the carrying pliers. The seized tufts *b* when being inserted brush over a comb 78 so that they are simultaneously cleaned. One head part 35 of the gripping pliers 36 is longer than head part 34 (Fig. 2) and the prolonged head part 35 serves to guide the tuft, conveyed by the pliers 45, 46 into the head parts 34, 35.

The movement of the pliers 45, 46 from the receptacle 44 to the heads 34, 35 is effected by the driving shaft 2 by means of a grooved disk or an eccentric. This actuates an arm 109 and the spindle 110 upon which is situated an arm 111, which carries the carrying pliers, so that upon the turning of spindle 110 the lever 111 with carrying pliers is swung backward and forward.

The heads 34, 35 serving to receive the tuft are formed as pliers and provided with the two plier arms which turn about pins 79 and are held closed by a spring 80, while they strike a pin 81 which prevents complete closing of the gripping pliers. The heads 34, 35 are given a funnel like form in which rests the bent tuft until its arrival before the brush block c. According to the present invention the gripping pliers 36 during the beginning of their movement are forcibly guided and for this purpose the gripping pliers are at the rear of their ends provided with guides 82 or the like opening toward the rear, which guides coöperate with stationary pins 83, and hence the gripping pliers are soon released during their forward movement. The guides 82 are so formed that not only the gripping pliers 36 are opened as before to release the inserted tuft $b$, but according to the present invention these guides also serve to cause the head part 35 to bend the tuft in the middle as soon as it is drawn by the wire into the opened head parts 34, 35. This bending is effected by closing the gripping pliers 36 by means of the guides 82 and the pins 83. When this has been done the gripping pliers 36 have moved so far forward that the pins 83 have left the guides 82 and the gripping pliers are only moved to the brush block c by the inserting wire $a$, while a spring 84 has a checking effect.

Due to the bending of the tuft $b$ the insertion of the tuft into the hole of the brush block c can be effected without difficulty and without causing fear of the wire breaking.

The gripping pliers 36 are disposed on a slide 85 which slides in the machine frame 1 (Fig. 1). The advance movement is effected by the drawing taut of the wire and against the action of the spring 84, which exerts a retarding effect. The backward movement is effected by the driving shaft 2 through an eccentric and an angle-lever 86 which turn about a pin 87, the forklike end of the lever 86 engaging a pin 88 of the slide 85 and moving back the gripping pliers 36.

In order to prevent the bristles of an inserted tuft $b$ from entering between the heads 34, 35 and catching there when the next tuft is inserted a protective cap 89 is provided which covers the heads 34, 35 and with its pin 90 is mounted, axially displaceable, in a bushing 91 of the machine frame 1. (Figs. 7 and 8.) The cap 89 is under the influence of a spring 92 and the pin 90 is provided with a pin 93 which engages a slanting groove 94 of the bushing 91, so that the cap 89 upon pressing against the brush block c is turned simultaneously with the release of the tuft just inserted. Then according to the present invention there is provided a device to convey the material to the dividing device 47. The conveying device consists essentially of one or more conveyer belts 96 which run over guide rollers 97 and can be made more or less taut by a tension device consisting of an adjusting member 99 provided with a roller 98. The material is guided by means of the walls 44, 100, and 101, and in order to move the material constantly forward, that is to conduct it to the dividing device 47 known in itself, the conveyer belts 96 are provided with a number of catch pins 102 which seize the material and carry it along, for which purpose the conveyer belt 96 with the catch pins 102 are kept in motion by the impulse of a weight. It is self-evident that the driving of the conveyer belts can be also effected by the driving shaft 2. In order that the catch pins 102 may release the material at the delivery point and be out of the reach of the work parts of the dividing device 47, the catch pins 102 are made yielding, to which end they are rotatably arranged on the conveyer belts 96. The belts have portions 104 cut away so that if necessary the catch pins 102 can be turned back completely. In order to prevent the catch pin 102 from swinging backward when conveying the material the wall 100 is provided upon which slide the belts 96 with the catch pins 102. At a suitable point this wall 100 has a cut away portion 105 so that there the catch pin 102 can turn back (Figs. 19 and 20).

Instead of a conveyer belt 96 a conveyer chain 106 can be used just as well, while by dispensing with some chain members the necessary opening 107 for the passage of the catch pin 102 is procured (Figs. 21 and 22).

The operation is as follows: After the operator has pressed the wire coming from reel 3 between the jaws 24 and 27 of the lever 25, carried it around guide rollers 4 and 10 and has carried it from below into the eye 33 of the needle 5 projecting in its end position, he leads the free end $d$ of the wire into the jaws 20, 21, which are formed by the lever 18 and the machine frame 1, and, after he has attached the brush block c as indicated in Fig. 1, he starts the machine. The needle 5 advances and, since the free end $d$ of the wire is clamped fast, wire is drawn from the reel 3, and the wire looped over the needle is carried into the tapered jaws 38 of the spreading device which opens the wire into a loop, whereupon the needle is drawn back. Hereupon the parts 45, 46 place in the loop (Figs. 9, 10, 15 and 16) the tuft $b$ divided from the receptacle 44 and bend it into U-form by means of the prolonged part of the head 35 of the gripping pliers 36. Simultaneously the jaws 38 return to their position of rest. The wire, held by the jaws 20, 21, 24, and 27, is now drawn taut by the roller 10 by means of the lever 11. Hereupon the tuft *b* is drawn between the heads 34, 35 between which it remains until the latter strike the brush block *c*. Then the gripping pliers 36 open, while the tuft is being drawn by the wire into the brush block. The lever 25, pliers 45, 46 and gripping pliers 36 now return to their position of rest. The operator now draws the free end *d* of the wire from the clamp 20, 21 and places the next hole of the brush block *c* over the projecting needle point, again starts the machine and the operation is repeated, while the needle 5 carries the wire, brought over the needle from the roller 10, to the jaws 38. The operator now has only to move the brush block *c* from hole to hole from below upward, and to start the machine. As shown in Fig. 11 the ends of the wire of a finished brush are looped several times around the inserted wire whereby a sufficient fastening is obtained.

I declare that what I claim is:—

1. In a machine for inserting tufts into brush blocks, the combination of means for forming a wire loop and inserting therein a bristle tuft, and for drawing the loop to insert the tuft in a brush block, of a pair of gripping pliers bodily movable to and from the brush block to feed tufts thereto, and having gripping heads closing lengthwise of a tuft in the loop, and means for closing the gripping heads upon a tuft, whereby the tuft is forcibly bent before its movement into the brush block.

2. In a machine for inserting tufts into brush blocks, the combination of a pair of movable gripping pliers comprising movable members carrying gripping heads and having rearwardly opening guide-slots; carrying pliers for feeding tufts to the gripping heads; fixed pins disposed in said slots; and means for forcing said members forward to cause said pins to engage said slots and cause said gripping heads to bend said tufts.

3. In a machine for inserting tufts into brush blocks, the combination of means for supporting a brush block, means for feeding loops of wire through the brush blocks; gripping pliers having gripping heads disposed about said loops; means for feeding tufts to the loops; means for causing said gripper members to close upon and bend said tufts after they are fed to the loops; means for grasping said wire and drawing the loops back into the brush blocks; and a spring mounted displaceable guide roller between the brush block and the drawing means and over which said wire is passed.

4. In a machine for inserting tufts into brush blocks, the combination of means for supporting a brush block; means for passing wire loops through the brush block and drawing the same back into the brush block, said means comprising levers, a resilient member between said levers; and means for feeding tufts to the loops.

5. In a machine for inserting tufts into brush blocks, the combination of means for supporting a brush block; a pulling lever carrying a wire clamping device and adapted to move remote from the brush to draw the wire and remain stationary in its remote position; and a lever carrying a spring mounted roller and adapted to complete the insertion by the roller.

6. In a machine for inserting tufts into brush blocks, the combination of means for supporting a brush block; a pulling lever carrying a wire clamping device and adapted to move away from the brush to draw the wire and to remain stationary at the limit of its movement away from the brush; and a lever carrying a spring mounted roller and adapted to move to complete the insertion by the roller; and means for causing said last named lever to remain at the end of its movement until said wire clamping device has released the wire and the spring action ceases.

7. In a machine for inserting tufts into brush blocks, the combination of means for supporting the brush block, means for passing loops of wire therethrough, and feeding means for feeding tufts to the loops, said feed means comprising a pair of plier parts, a support for one of said parts, a pivoted double-armed lever having its ends engaging said parts, and means for pivotally moving said lever.

In testimony whereof I affix my signature, in presence of two witnesses.

GEORG KLEEMANN.

Witnesses:
 ANTON AUTZ,
 ERNEST ENTENMANN.